March 10, 1959

L. P. FRIEDER ET AL 2,876,492

APPARATUS FOR MOLDING PLASTIC

Filed March 25, 1954

INVENTORS
LEONARD P. FRIEDER
WALTER S. FINKEN

BY Henry L. Scherier

ATTORNEY

March 10, 1959 L. P. FRIEDER ET AL 2,876,492
APPARATUS FOR MOLDING PLASTIC
Filed March 25, 1954 3 Sheets-Sheet 2

INVENTORS
LEONARD P. FRIEDER
WALTER S. FINKEN
BY
ATTORNEY

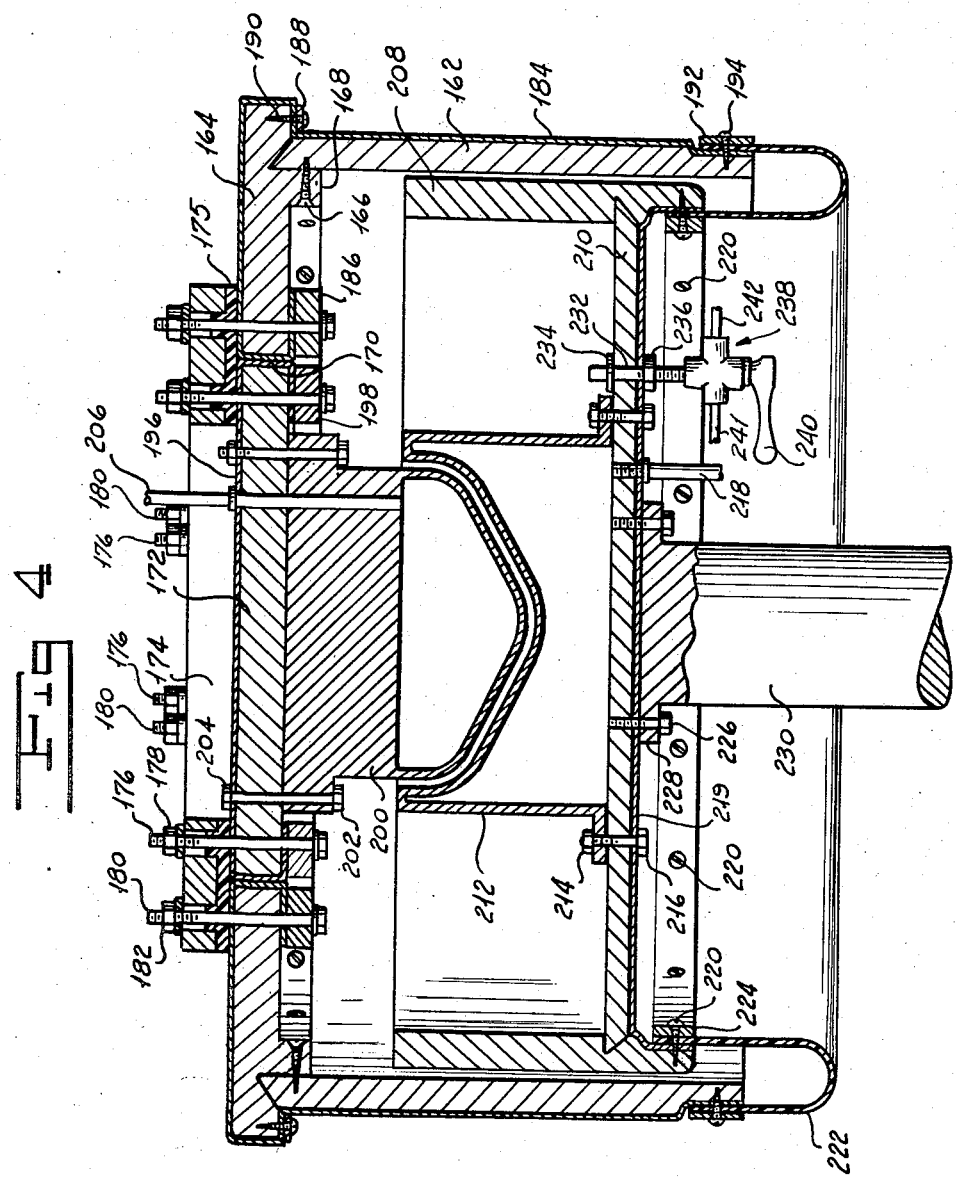

United States Patent Office 2,876,492
Patented Mar. 10, 1959

2,876,492
APPARATUS FOR MOLDING PLASTIC

Leonard P. Frieder, Great Neck, and Walter S. Finken, Brooklyn, N. Y.; said Finken assignor to said Frieder Application March 25, 1954, Serial No. 418,634

7 Claims. (Cl. 18—5)

Our invention relates to apparatus for molding plastic and more particularly to an improve apparatus for molding plastic-impregnated fibrous material, which apparatus is provided with means for substantially reducing the defects in the final product resulting from entrained air, vapors and gases liberated during setting of the material being molded.

In the molding of plastic material and fibrous material impregnated with a plastic, a charge of the material to be molded is placed between a pair of complementary mold members, and the plastic material is set under the action of heat and pressure. Many of the final products molded on apparatus of the prior art must be rejected because of blisters, pin holes, and the like in the surface of the molded article. These pin holes and the like result from the entrained air, vapors, and the gases freed during the curing of the resin from the volatile solvents used as plasticizers and from the adulterates in the plastic material. While this defect exists generally where a synthetic resin alone is being molded, it is especially evident where fibrous matting or the like is employed for reinforcing the plastic, since gas bubbles tend to cling to the individual fibers and be captured between groups of fibers. An attempt has been made to solve this problem by employing wetting agents to increase capillary action during the molding process. These wetting agents have not, however, adequately eliminated entrained air and the gases liberated during the process. We have invented an improved molding apparatus by means of which gas and vapor bubbles in the material being molded are removed before the cooperating molds are completely closed. It will be appreciated that the amount of entrapped air and the solvent used will vary from charge to charge of material being molded. In spite of these facts, our apparatus produces homogeneous moldings since substantially all the entrained air, vapor and liberated gases are removed from each charge before each molding operation.

One object of our invention is to provide an improved molding apparatus in which gas, vapor and air bubbles in the material being molded are substantially eliminated during the molding process.

Another object of our invention is to provide an improved molding apparatus in which the material being molded may be subjected to heat and subatmospheric pressure prior to the time when the complementary molds exactly register.

Yet another object of our invention is to provide molding apparatus in which the cooperating molds may be moved toward one another and the space enclosing the molds may selectively be sealed at any time during the movement of the molds relative to one another.

Other and further objects of our invention will appear from the following description.

In general, our invention contemplates the provision of an improved molding apparatus including a hollow piston carrying one of a pair of complementary molds and a cylinder carrying the other of the pair of molds. In the course of the molding operation the piston is telescoped within the cylinder so that the complementary molds register with one another. The arrangement is such that a substantial clearance is provided between the outer surface of the hollow piston wall and the inner surface of the cylinder wall. We provide an improved sealing means for selectively sealing the space enclosed by the piston and cylinder at any point in their movement toward one another. This sealing means permits the piston to be wholly withdrawn from the cylinder and repositioned within the cylinder without damage to the seal. Because of the substantial clearance between the cylinder wall and the outer surface of the piston, no damage to the walls can result from foreign matter clinging thereto. Moreover our selective sealing means permits the piston and cylinder to be telescoped without compressing the air in the space enclosed thereby.

Further, we provide our apparatus with means for selectively subjecting the space enclosed by the piston and cylinder to a vacuum. Means are provided for vibrating one of the piston or cylinder members with respect to the other. Before the molds are brought into registry to a degree required for molding, the relative movement of the piston and cylinder toward one another is arrested. At this time we heat the mold members by appropriate heating means and subject the space enclosed by the piston and cylinder to subatmospheric pressure. At the same time one of the piston or cylinder members is vibrated with respect to the other. This heat and vacuum, as well as the vibration, cause the entrained air bubbles and the gases and the vapors liberated from the volatile constituents of the material being molded to escape. The resulting product of our molding apparatus is substantially free of defects such as blisters, pin holes, and the like. We have provided an alternate form of our invention with means for producing a pulsating pressure over the surface of the material being molded. This action, as well as the vibrating action of the first form of our invention, coalesces the disseminated gas bubbles and overcomes surface tension to permit them to be liberated.

In the accompanying drawings which form part of the instant specification and which are to be read in conjunction therewith and in which like reference numerals are used to indicate like parts in the various views:

Figure 4 is a sectional view of yet another form of our improved molding apparatus.

Figure 1:
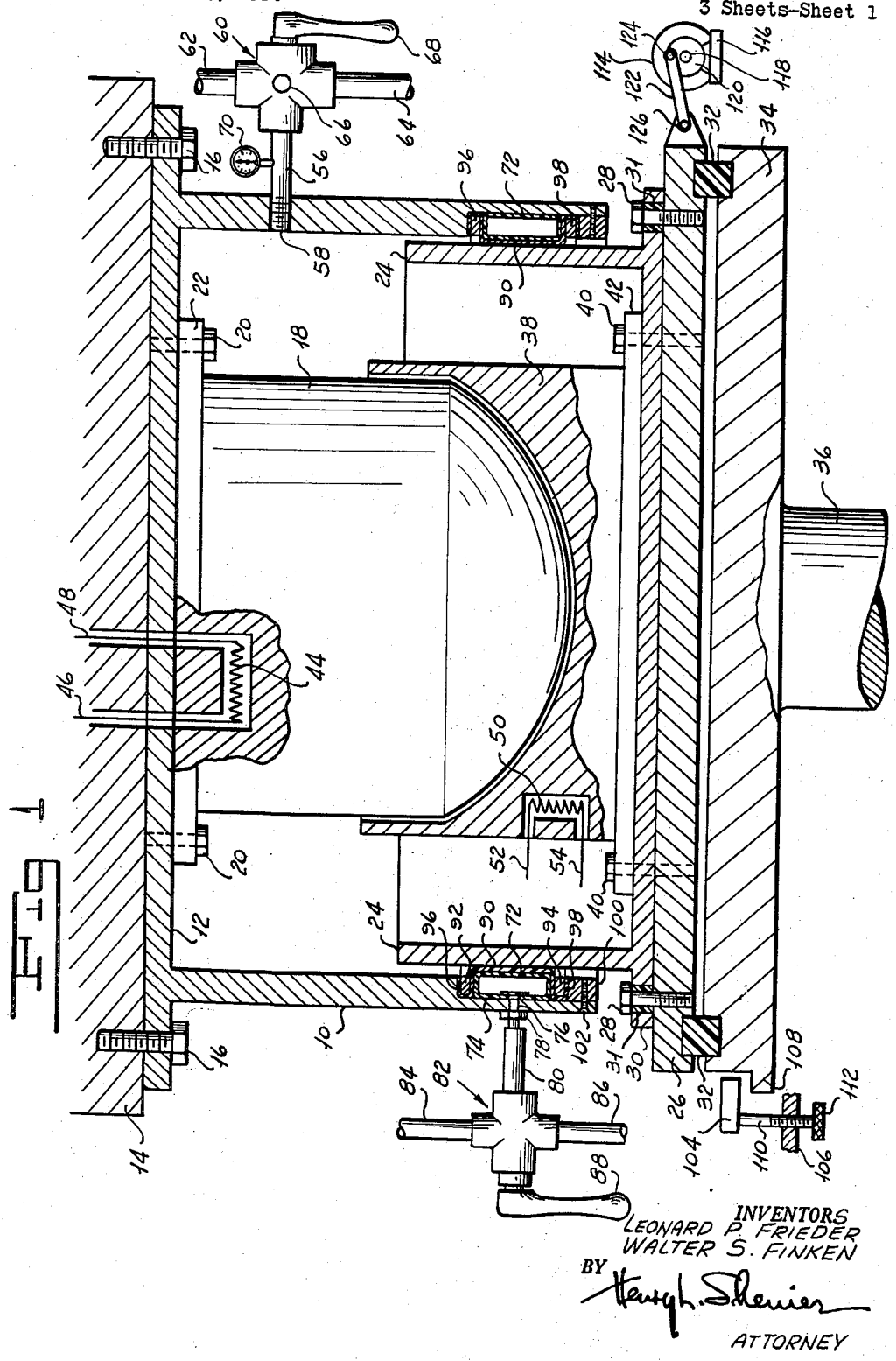
Figure 1 is a sectional view of one form of our improved molding apparatus showing the general arrangement of parts.

More particularly referring now to Figure 1, our improved molding apparatus includes a cylinder 10 formed with a base 12 and mounted on a fixed surface 14 by any appropriate means such as stud bolts or machine screws 16. A male mold member 18 is carried by the cylinder 10 and is mounted in the interior thereof by means of stud bolts 20 which secure a peripheral flange 22 formed on the male mold 18 to the base 12 of the cylinder 10. For cooperation with the cylinder 10 we mount a hollow piston 24 on a platform 26 by means of bolts 28 which secure a peripheral flange 30 formed on the base of piston 24 to the platform 26. The platform 26, in turn, is carried by flexible shock-absorbing mountings 32, such as rubber blocks or the like, mounted in the head 34 of a hydraulic plunger 36. Within the interior of the hollow piston 24 we mount a female mold 38 by means of screws 40 which secure a peripheral flange 42 formed on the base of the mold member 38 to the bottom of the piston 24. We provide flexible shock-absorbing rubber bushings 31 between the screws 28 and the flange 30.

We provide any appropriate means by which the mold members may be heated during the molding process. For example, we dispose a first heating element 44 in the male mold member 18. Heating element 44 is supplied with electrical energy by means of a pair of conductors 46 and 48 leading to an appropriate source of electrical energy (not shown). The element 44 may, if desired, be imbedded in the male member 18 or disposed within a hollow member 18. Alternately, we may provide steam inlets for heating the mold members if desired. The female member 38 may be heated by means of a resistance element 50 supplied with electrical energy by leads 52 and 54. This element 50 may also be replaced by a steam line leading to a hollow female mold 38 if desired.

In order to regulate the pressure in the space enclosed by the piston and cylinder, we screw a tube 56 into an opening 58 in the wall of the cylinder 10. An appropriate three-way valve, indicated generally by the reference character 60, provides a means for connecting the interior of the cylinder 10 selectively to a source of air under pressure, to the atmosphere, or to a means for evacuating the interior of the cylinder 10. A line 62 may, for example, lead to a source of air under pressure and a line 64 may lead to the evacuating means. A third line 66 may lead to the atmosphere. Valve 60 is controlled by a handle 68. An appropriate pressure indicating gauge 70 communicates with the line 56.

In order to provide a means for selectively sealing the space enclosed by the piston 24 and the cylinder 10, we dispose an inflatable circular sealing tube 72 within a recess 74 formed in the cylinder wall. A fitting 76 secured in the wall of cylinder 10 by a nut 78 provides a passage between the interior of inflatable ring 72 and a line 80 connected to a two-way valve, indicated generally by reference character 82. Valve 82 may alternately connect inflatable tube 72 to a pressure line 84 or to a line 86 running to the atmosphere or to an evacuating means (not shown). Valve 82 is controlled by a handle 88.

To protect the inflatable tube 72 from the effects of friction we dispose a shoe 90 between hte inner surface of the tube 72 and the piston 24. Shoe 90 may be formed from any appropriate elastic material. Preferably it is formed from rubberized canvas impregnated with graphite or a similar lubricant for sealing the pores of the canvas to prevent seepage of air through the canvas while permitting relative motion between the piston and cylinder. The shoe 90 is retained within the recess 74 by a pair of retaining rings 92 and 94. The edges 96 and 98 of the shoe 90 which are retained by the respective rings 92 and 94 are formed of a suitable resilient material vulcanized to the rubberized canvas shoe body 90. The assembly including the inflatable tube 72, the shoe 90, and the retaining rings 92 and 94 is held within the recess 74 by an annular member 100 secured to cylinder 10 by screws 102. It will be appreciated that the shoe 90 keeps air from flowing between the tube 72 and the wall of cylinder 10 to prevent the collapse thereof when the tube 72 is deflated. When the tube 72 is deflated, the pressure within the space enclosed by the piston and cylinder presses the shoe 90 against the cylinder wall to compress tube 72. Conversely, when tube 72 is inflated, it forces the shoe 90 against the piston wall effectively to seal the space enclosed by the piston and the cylinder while permitting relative motion therebetween.

In order to provide a means for temporarily arresting the relative movement of the piston 24 and cylinder 10 and the molds carried thereby toward one another, we mount a readily releasable adjustable stop member 104 on the frame 106 of the machine. Stop 104 is of the type which may be snapped into a position where it will be engaged by a projection 108 formed on the head 34 of the hydraulic plunger 36. Alternately, stop 104 may be moved to a position out of the path of projection 108 to permit the mold 38 to move to a position where it registers with mold 18 to the degree required for molding. Stop 104 is carried by a lead screw 110 mounted in a threaded hole in the frame 106. Lead screw 110 is formed with a knurled knob 112. Knob 112 may be rotated in one direction or the other to adjust the position of stop 104.

A motor 114 carried by stationary base 116 provides a means for vibrating the platform 26 and thereby the mold member 38 relative to the mold member 18 to assist in the removal of entrained air and gas bubbles from the plastic. Motor 114 drives a shaft 118 carrying a crank disk 120. A connecting rod 122 is connected by crank pin 124 to crank disk 120 and by pin 126 to the platform 26. As shaft 118 rotates, the platform 26 vibrates on its flexible mountings 32 at a vibratory speed depending on the speed of the motor 114 and through an amplitude depending on the throw of the crank pin 124.

Figure 2:
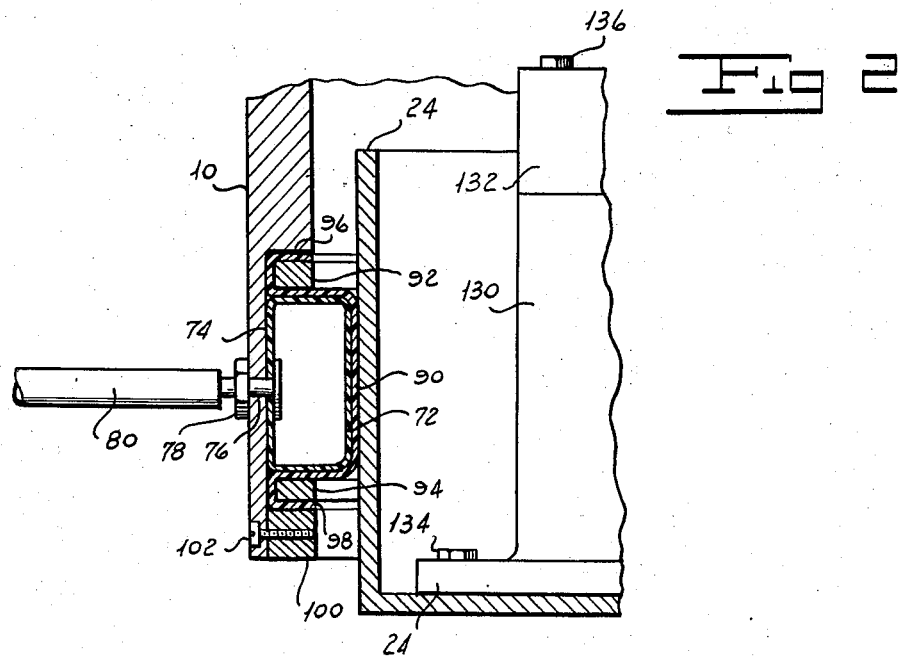
Figure 2 is a fragmentary sectional view drawn on an enlarged scale of our improved molding apparatus.
Figure 3:
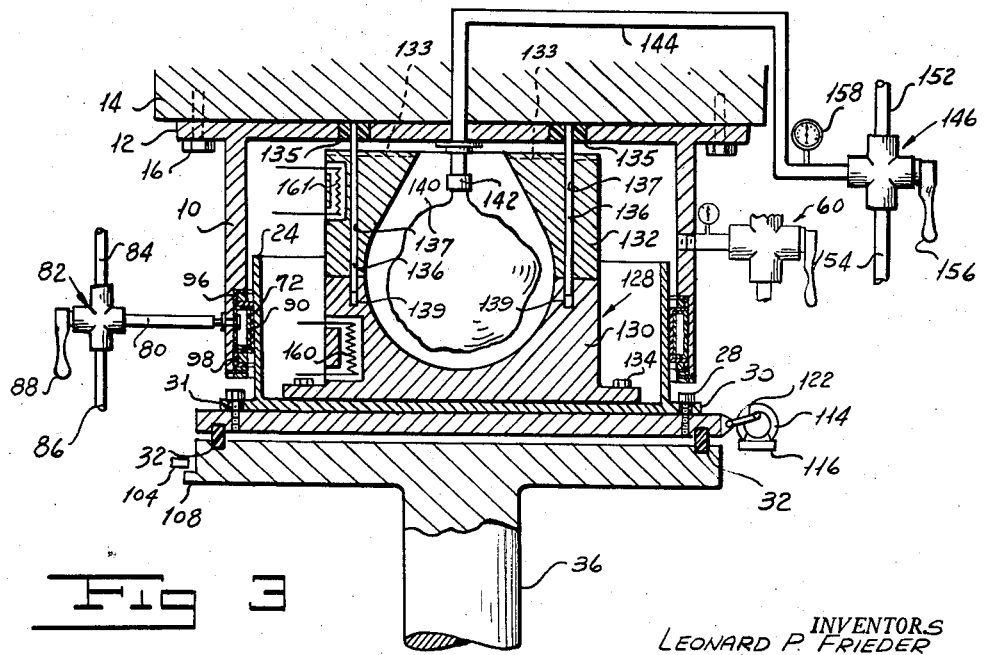
Figure 3 is a sectional view drawn on a reduced scale of another form of our improved molding apparatus.

In Figure 3 we have illustrated another embodiment of our invention which may be employed when it is necessary to form an article having a cross section which subtends more than 180 degrees. With the exception of the mold members, this construction is similar to that illustrated in Figures 1 and 2. The female mold member in Figure 3, indicated generally by the reference character 128, is formed by a pair of sections 130 and 132. The lower section 130 is secured to the base 30 of the piston 24 by screws 134. I mount dowel pins 136 in shock-absorbing bushings 135 carried by the base 12 of cylinder 10. Pins 136 pass through bores 137 in section 132 and extend into holes 139 in section 130. The arrangement is such that when the axes of the bores 137 are aligned with the axes of holes 139, section 132 properly registers with section 130. Dowel pins 136 are so positioned in base 12 that they align bores 137 with corresponding holes 139. Bushings 135 permit the female mold assembly 128 to be vibrated with respect to the male mold member, to be described hereinafter. This sectional construction of the mold 128 is necessary in order that the re-entrant article formed therein may readily be removed after molding.

The male mold member 140 in the form shown in Figure 3 is an expansible bag formed of any appropriate material such as rubber or the like, of a sufficient strength to withstand the pressures employed in molding. Bag 140 is, it will be understood, formed of a material which will not be deleteriously affected by the temperatures employed in molding. Bag 140 is connected by a fitting 142 to a fluid pressure line 144 passing through the base 12 of cylinder 10 and through member 14 to a two-way valve, indicated generally by reference character 146. A fitting 148 holds the line 144 in position on the base 12. Valve 146 connects the interior of bag 140 selectively to a line 152 running to a source of fluid under pressure or to a line 154 connected to the atmosphere or to appropriate means for collapsing bag 140. Valve 146 is controlled by a handle 156. A pressure-indicating device 158 communicates with line 144 to provide an indication of the pressure within the bag 140. The fluid employed to expand bag 140 into registry with the mold 128 may be of controlled temperature. Section 130 is provided with heating means such as resistance heater 160 similar to the heating element 50 provided in mold member 38. Section 132 is provided with a heating element 161.

The remainder of the structure of the form of our invention illustrated in Figure 3 is similar to that of the form of the invention shown in Figures 1 and 2. A valve 60 is provided for controlling the pressure within the space enclosed by the piston and cylinder. An inflatable tube 72 and associated structure is provided for selectively sealing the space enclosed by the piston and cylinder. A motor 114 provides a means for vibrating the female mold member with respect to the male mold member. It will be appreciated that in this construction shown in Figure 3, bag 140 is collapsed during the period when the piston and cylinder are moved toward one another. Just previous to the time when the relative position of the piston and cylinder is that required for the molding operation, the relative movement of the piston and cylinder is arrested by the stop 104. At this time tube 72 is inflated to seal the space enclosed by the piston and cylinder. Valve 60 may then be actuated to evacuate the enclosed space and motor 114 driven to vibrate mold member 128. At the same time, heating elements 160 and 161 heat mold 128 to heat the plastic material and assist in freeing entrained air, vapor and gas bubbles from the plastic material. After a period of time, stop 104 is released to permit further relative movement between the piston and cylinder to molding position. The arrangement is such that the upper surface of section 132 registers with base 12 during the molding operation. The upper surface of section 132 is formed with radial scores 133 through which any gases liberated during the molding operation may escape. Bag 140 may be supplied with fluid under suitable pressure and the pressure within the space enclosed by the piston and cylinder may be controlled to a degree proper for molding.

In Figure 4 we have shown yet another form of our improved molding apparatus employing a modified means for sealing the space enclosed by the piston and cylinder. The cylinder wall 162 is provided with an annular cover piece 164 secured thereto by means of screws 166 connecting a flange 168 formed on member 164 to the cylinder wall 162. Member 164 provides a circular hatch 170 which may be closed by an appropriate hatch cover 172. Cover 172 is retained in position in the hatch 170 formed by the member 164 by means of a ring 174. A first series of bolts 176 passing through ring 174 and through the hatch cover 172 secure cover 172 to the ring 174. Bolts 176 are secured in position by nuts 178. A second series of bolts 180 passing through the member 164 and the ring 174 are held in place by nuts 182 and provide a means for securing the member 164 to the ring 174. It will be appreciated that this construction holds the cover 172 in position within the hatch 170 formed by member 164. An annular rubber gasket 175 is disposed between ring 174 and the cover assembly to seal the junction of cover 172 and member 164.

The cylinder wall 162, as well as the member 164 and cover 172, may be formed of any appropriate material such as wood or the like. When these members are formed of wood, an aluminum foil seal is cemented to the outer surface of each of the members. For example, foil 184 is cemented to the outer surface of wall 162 and is extended up and around the outer surface of member 164. A sealing ring 186 carried by the bolts 180 holds the edge of the foil seal in close engagement with the member 164. A ring 188 held to the member 164 by screws 190 holds the foil into close engagement with the shoulder formed by the junction of members 162 and 164. A sealing ring 192 held to the wall 162 by screws 194 holds the edge of the foil seal into engagement with the lower edge of the wall 163. A seal 196 similar to the seal 184 is cemented around the outer surface of the cover 172 and its edge extended around the edge of member 172. The extended edge of the seal is held into engagement with the cover 172 by a ring 198 carried by the bolts 176.

The male mold member 200 of this form of our invention is fixed to the underside of removable cover 172 by bolts 202 secured by nuts 204. Member 200 is hollow. An appropriate steam line 206 provides a communication between the hollow interior of mold 200 and a valve (not shown), which may alternately be connected to a supply or return line. This valve controls the line 206 and provides means for controlling the temperature of the male mold member. The cylinder formed by wall 162, member 164, and cover 172 is carried on a fixed portion (not shown) of the molding apparatus.

The hollow piston member of this form of our invention includes a wall 208 carrying a base 210 to which we secure a hollow mold member 212 by means of bolts 216 secured by nuts 214. A line 218 connected to the interior of the member 212 may alternately be connected to a source of steam or to a return line by means (not shown). Line 218 thus provides a means for controlling the temperature of the mold member 212. If the piston wall 208 and base 210 are formed of a material such as wood, an aluminum foil or other similar seal 219 is cemented to the underside of base 210 and held in engagement with the piston wall 208 by screws 220.

In order to provide a seal for the space enclosed by the piston and cylinder wall and to permit relative movement between the piston and cylinder, we provide an annular flexible diaphragm 222, formed of any appropriate material which provides a seal such as rubber, rubberized fabric, or the like. This diaphragm 222 is secured along one edge to the cylinder wall 162 by the ring 192 held to the cylinder wall by the screws 194. The other edge of the member 222 is held to the piston wall by a ring 224 fixed to the piston wall 208 by the screws 220. Diaphragm 222 is in free suspension and permits a relative movement between the piston and cylinder while maintaining the seal for the space enclosed by the piston and cylinder.

The hollow piston formed by the wall 208 and the base 210 is fixed by screws 226 to the head 228 of a hydraulic plunger 230. While we have described the cylinders 10 and 162 and the pistons 24 and 208 as of cylindrical shape, it will readily be appreciated that we may form these members with any cross-section to provide a mold box of any desired configuration.

In order to control the pressures within the space enclosed by the piston and cylinder, we provide a line 232 secured in the base 210 of the piston by a fitting 234 held in place by a nut 236. Line 232 provides communication between the space enclosed by the piston and cylinder and a valve, indicated generally by the reference character 238. Valve 238 may alternately connect a pressure line 241 or a line 242 running to an evacuating means (not shown) to the line 232. Valve 238 is actuated by a handle 240. Handle 240 may be actuated alternately to connect line 232 to the source of pressure and to the evacuating means to provide a pulsating pressure over the surface of the plastic material. This action coalesces the disseminated minute gas or vapor bubbles and overcomes surface tension to permit them to be liberated. The temperature control provided by lines 206 and 218, assists in freeing entrained air or gas bubbles from the plastic solution.

In use of the form of our invention illustrated in Figure 1, the inflatable tube 72 is first collapsed and plunger 36 moved to a position where piston 24 is completely withdrawn from the cylinder 10. A charge of plastic-impregnated fibrous material is then placed within the recess of the female mold member 38. The hydraulic plunger is moved to move the piston within the cylinder to the distance permitted by stop 104. When projection 108 engages stop 104 to limit the relative movement of piston 24 toward cylinder 10, handle 88 is operated to connect tube 72 to the pressure line 84. When tube 72 is thus inflated, it moves the shoe 90 into engagement with the piston 24 to seal the space enclosed by piston 24 and cylinder 10. The heating elements 44 and 50 are energized to heat their respective mold member so that the plastic impregnating the fibrous material is heated to the required degree. Handle 68 is actuated to connect line 56 to the evacuating means (not shown) connected to line 64 to evacuate the space enclosed by the piston and cylinder and scavenge the liberated gas. Motor 114 is energized to vibrate the platform 26 on its mounting 32. It will be readily appreciated that this vibration of the platform 26 vibrates mold member 38 carrying the charge of material to be molded with respect to the male mold member 18. It will be appreciated that stop 104 is positioned so that at this time the mold members 18 and 38 are not in sufficient registry so that the vibration of the mold member 38 will interfere with the mold member 18. The clearance between the outer surface of the piston 24 and the inner surface of cylinder 10 is sufficient to permit the vibration of the piston with respect to the cylinder. Inflatable tube 72 and the shoe 90 permit this vibration without destroying the seal they provide for the space enclosed by the piston and cylinder members.

We have seen that the entrained air bubbles and vapor bubbles generated by volatile solvents in the plastic solution are readily freed when the plastic solution is heated and subjected to a vacuum. This action is assisted by vibration of the means carrying the charge of material to be molded. The heating of mold members 18 and 38 by elements 44 and 50, the partial vacuum provided in the line 56 communicating with the space enclosed by the piston and cylinder and the vibration of mold member 38 by the motor 114 all assist in coalescing the disseminated minute gas bubbles and overcoming surface tension to permit the bubbles to be liberated. The liberated gas is scavenged from the enclosed space by the evacuating means. When these conditions have been continued for a predetermined period of time, which period may be determined as that necessary to produce a satisfactory product, stop 104 is moved out of engagement with projection 108 to permit continued movement of plunger 36 to move dies 18 and 38 into registry for molding. It is to be noted that the seal provided by inflatable tube 72 and shoe 90 permits this continued movement without breaking the seal. During the molding operation the temperature of the material being molded may readily be controlled by the elements 44 and 50. The pressure at which molding takes place is controlled by valve 60. It is to be understood that motor 114 is de-energized to stop the vibration of platform 26 before stop 104 is moved to a position permitting the mold members to be moved into registry with one another.

When the molding operation is complete, valve 60 may be actuated to connect line 56 to the source of compressed air to separate mold member 18 from member 38. The inflatable tube 72 may then be collapsed and the piston 24 withdrawn from the cylinder 10 to permit removal of the molded article. The molding apparatus is then ready for the next succeeding operation.

In use of the form of our invention shown in Figure 3, the operation is substantially the same as that described in connection with the apparatus of Figures 1 and 2. The piston is first moved out of the cylinder and a charge of material to be molded placed within the mold member 128 formed by sections 130 and 132. Bag 140 is, of course, at this time collapsed. The plunger 36 is then moved up to a point where it is stopped by stop 104. The tube 72 is inflated to seal the space enclosed by the piston and cylinder and the element 160 energized to heat mold member 128. At this time, fluid at an appropriate temperature may be admitted to bag 140 to expand the bag to a degree just short of that required for molding. Valve 60 is actuated to a position where the space enclosed by the piston and cylinder is evacuated and motor 114 is started to vibrate the member 128. When these conditions have been continued for a period of time sufficient to free entrained air, vapor and gas bubbles from the plastic solution, motor 114 is stopped, stop 104 is released to permit plunger 36 to move assembly 128 to molding position, bag 140 is fully expanded and the pressure in the space enclosed by the piston and cylinder members is regulated by valve 60 to a pressure requisite for molding. After the molding operation is complete, valve 146 is actuated to collapse bag 140. If necessary, a blast of compressed air may be blown into the space enclosed by the piston and cylinder to force mold member 128 away from the bag. The tube 72 is deflated and plunger 36 operated to withdraw the piston from the cylinder and move mold member 128 away from the bag 140. In order to remove the molded article from the die 128, section 132 is first removed and then the article is withdrawn. In the succeeding operation section 132 is realigned with section 130 by dowel pins 136.

In use of the form of our invention shown in Figure 4, hatch cover 172 is first removed by unfastening bolts 176 and 180. A charge of material to be molded is then placed within the recess of mold 212. Cover 172 is then replaced. The temperature of the material to be molded is regulated by the steam lines 206 and 218. The hydraulic plunger 230 is then moved to a position where mold members 200 and 212 are in registry almost to a degree necessary for molding. The pressure within the space enclosed by the piston and cylinder is then varied by alternately actuating valve 238 to a position where the enclosed space is connected to a source of pressure and then to a position where the space is evacuated. The resulting pulsation of pressure over the surface of the material to be molded assists in liberating entrained air and gases liberated from the plastic solution. When these conditions are continued for a predetermined time, plunger 230 is actuated to move the molds into molding position, and the molding operation is performed. When the molding operation is completed, cover 172 is removed to permit removal of the molded article.

It will be seen that we have accomplished the objects of our invention. We have provided a molding apparatus by means of which we may substantially eliminate blisters and pin holes from the finished product. We have provided a molding apparatus which permits removal of entrained air, air in solution, vapors or gases liberated during the molding operation. Our improved apparatus permits vibration of a piston with respect to a cylinder without breaking the seal provided for the space enclosed by the piston and cylinder. Our apparatus is provided with means for controlling pressure within the space enclosed by the piston and cylinder and with means for controlling the temperature of the material being molded. Our apparatus enables us to produce homogeneous castings in spite of the fact that the amount of entrapped air and the solvent may vary from charge to charge of the material being molded.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. Apparatus for molding plastic including in combination a first mold-carrying member having an open end and a closed end, a first mold portion carried by said first member, a second mold-carrying member adapted to telescope within the first mold-carrying member to enclose a space, a second mold portion carried by the second mold-carrying member, means for moving said mold carrying members toward each other to encl;ose a space between said members, resilient means for sealing the space enclosed by said members while permitting relative movement between the members, each of said members being formed with a wall, the arrangement being such that a lateral clearance is provided between said walls when the members are in telescoped relationship, and means for vibrating one of said mold members with respect to the other.

2. Apparatus as in claim 1 in which said means for moving said members toward each other comprises a piston and resilient means for mounting one of said members on said piston.

3. Apparatus for molding plastic as in claim 1 wherein said means for selectively sealing the space enclosed by the piston and cylinder is an inflatable tube, and wherein said actuating means includes means for selectively inflating and deflating said tube.

4. Apparatus for molding plastic as in claim 1 wherein said means for selectively sealing the space enclosed by the piston and cylinder comprises an inflatable tube disposed between said piston and said cylinder, a shoe disposed between said tube and said piston, said shoe being carried by said cylinder and wherein said actuating means includes means for selectively inflating and deflating said tube.

5. Apparatus for molding plastic as in claim 1 including means for heating said first and second mold members.

6. Apparatus for molding plastic as in claim 1 including means for controlling the presure within the space enclosed by said piston and said cylinder.

7. Apparatus for molding plastic as in claim 1 wherein said first mold member is formed by a pair of sections and means for joining said sections to form a female mold member, said second mold member being an expansible bag and means for expanding and collapsing said expansible bag.

References Cited in the file of this patent

UNITED STATES PATENTS

| | | |
|---|---|---|
| 672,475 | Cavallaro | Apr. 23, 1901 |
| 1,480,719 | Gammeter | Jan. 15, 1924 |
| 2,165,671 | Ward | July 11, 1939 |
| 2,351,343 | Kelley | June 13, 1944 |
| 2,437,003 | Ruegg | Mar. 2, 1948 |
| 2,473,588 | Johnson | June 21, 1949 |
| 2,575,734 | Schulman | Nov. 20, 1951 |
| 2,586,148 | Clark et al. | Feb. 19, 1952 |
| 2,700,796 | Roman | Feb. 1, 1955 |
| 2,755,532 | Pallier | July 24, 1956 |

FOREIGN PATENTS

| | | |
|---|---|---|
| 486,452 | Great Britain | June, 3, 1938 |
| 508,598 | Great Britain | July 4, 1939 |